April 22, 1941.  A. BOCH  2,239,032
APPARATUS FOR EXAMINING FILMS
Filed April 24, 1940
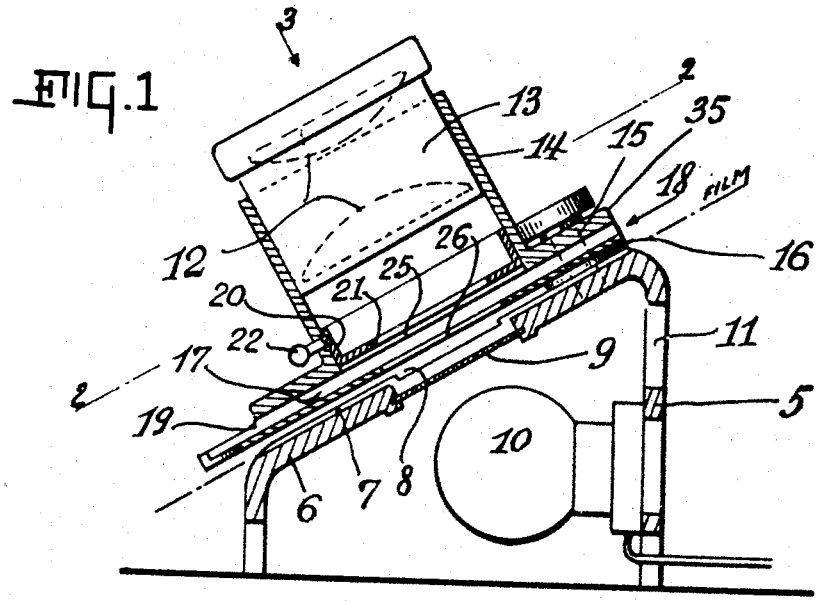
Fig. 1
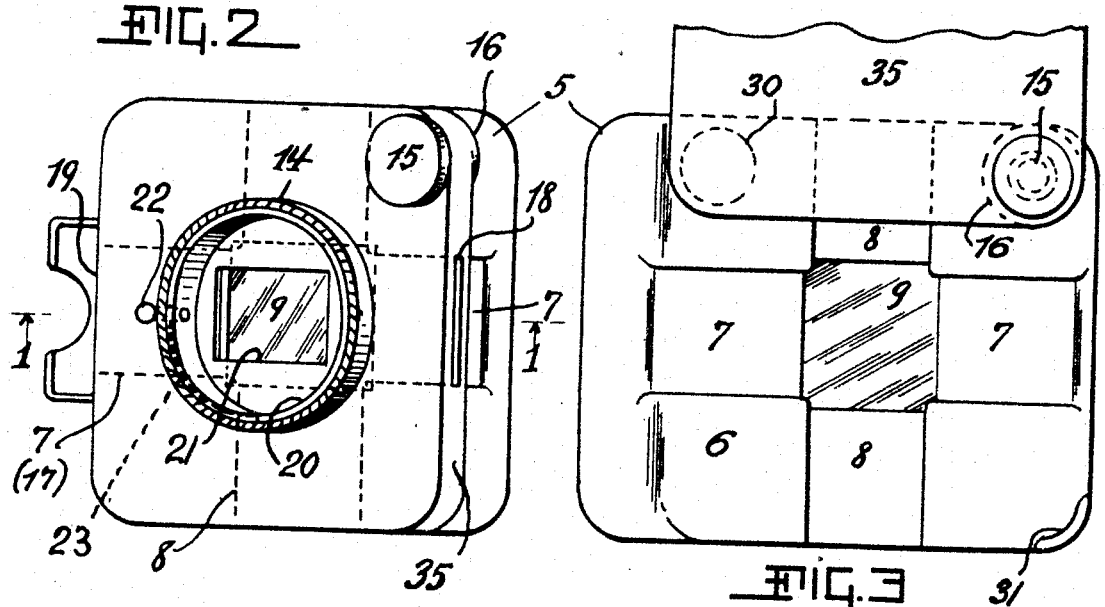
Fig. 2
Fig. 3
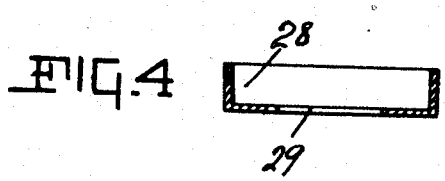
Fig. 4
INVENTOR.
ALFRED BOCH
BY
Ivan E. A. Konigsberg Patented Apr. 22, 1941

2,239,032

UNITED STATES PATENT OFFICE 2,239,032

APPARATUS FOR EXAMINING FILMS

Alfred Boch, Yorktown Heights, N. Y., assignor to E. Leitz, Inc., a corporation of New York Application April 24, 1940, Serial No. 331,286

8 Claims. (Cl. 40—130)

The object of this invention is to provide an apparatus for examining films, lantern slides and the like. One object is to provide an apparatus of relatively small compact design and construction characterized by extreme simplicity and convenience in operation and use. Another object is to provide means for selectively examining films or glass slide pictures irrespective of the relative position of the picture upon the film or slide, that is the apparatus provides means for viewing the picture right side up and correctly oriented as to right and left sides. Another object is to provide means for adjustable framing of the picture. Another object is to provide means for ready accessibility and cleaning of the film and slide guiding ways or grooves.

Accordingly the invention is embodied in an apparatus for examining films and picture slides arranged and constructed to accomplish the aforesaid objects and as disclosed in the following specification and illustrated in the accompanying drawing in which—

Fig. 1 is a central vertical sectional view through the apparatus taken substantially on the line 1—1 of Fig. 2.

Fig. 2 is a sectional plan view taken on the line 2—2 of Fig. 1.

Fig. 3 is a top view looking in the direction of arrow 3 in Fig. 1 with details omitted and parts broken away.

Fig. 4 is a sectional view of a modified framing member.

The apparatus comprises a base 5 having an inclined top 6 provided with crosswise arranged depressed film strip guiding ways 7 and 8 at right angles to each other. In the center there is an opening covered with a ground glass 9. The base supports an electric lamp 10 and has ventilating openings as at 11. The optical viewing lens system 12 is contained within a tubular housing 13 suitably supported within a housing 14. The optical means may be focusable and supported in any manner known to the art and such details are not shown.

The housing 14 may be secured to the base in fixed position or it may be movably supported thereon. As shown the housing is secured by means of a pivot screw 15 so that by loosening the latter the housing may be swung to one side as shown in Fig. 3. The screw or threaded bolt 15 passes through a lug 16 which spaces the housing 14 above the base top 6. The housing is formed with a foot 35 which covers the top 6 of the main base 5. The housing foot 35 has a lantern slide guiding channel 17 with an entrance at 18 and an exit at 19. It also has inspection openings at 25 and 26. Within the housing 14 is suitably mounted a rotatable picture framing member 20 in the form of a shallow cup having a framing opening at 21 and an operating handle 22 detachably screwed into the cup. The latter is of very light material and may be held frictionally in the housing 14. The handle 22 moves within a ninety degrees slot 23 in the housing 14. This slot is indicateed by the dotted line 23 in Fig. 2.

When a film strip is to be examined it may be inserted in the guide way 7 and will then be movable therein towards the operator or it may be moved crossways of the apparatus in the other film guide 8. This will depend upon the position of the pictures on the film strip or as it may be deemed most convenient. Correspondingly the framing member 20 will be rotated ninety degrees to frame the pictures in the opening 21. A glass slide or lantern slide is examined by sliding it downwards in the channel 17 to position under the framing opening 21, the member 20 being rotated to suit the framing of the picture on the slide. The latter will of course be stopped in its downward slide by a previously inserted slide or other member the parts being proportioned to suit. After inspection the first slide will be removed through the exit 19 and the examined slide will move down in the channel 17 by gravity. It will be noted that the openings 25 and 26 are inspection openings through which the object may be seen. The opening 21 serves of course a similar purpose but is additionally a framing opening to be adjusted to accord with the position of the particular picture to be examined. The opening 21 is oblong, not square. The member 20 may be rotated so that the long sides of the opening 21 may always be parallel with the long sides of the views to be inspected irrespective of their positions. The opening 21 therefore frames the view to be seen through the opening 25 and which is illuminated from below through the other opening 26. If the views are smaller than the opening 21 another framing member may be inserted, see Fig. 4.

The housing 13 may be swung to one side on the pivot bolt 15 as shown in Fig. 3 whereby the channel and guide may be easily cleaned, also for the purpose of changing the framing member. Thus the handle 22 may be screwed from the member 20, the latter dropped and another member 28, Fig. 4, with an opening 29 different from the opening 21 is pushed up into the housing. The handle 22 is then screwed into the new framing member which is ready for operation. The housing may have a second spacing foot 30 which abuts a stop 31 on the base 5 to accurately position the housing when it is swung back as will be understood. The pivot bolt 15 is used as a clamping screw to place the housing 13 firmly in position. The foot 30 is shown only in Fig. 3.

I claim:

1. In an apparatus of the character described, supporting means including an inclined lantern slide guiding channel, an optical system on said supporting means for observing a lantern slide placed in said channel, an adjustable movable framing member having an oblong framing opening supported above said channel in the optical axis of said optical system and means for operating said member to frame a lantern slide view placed in said channel for observation with the long sides of said opening corresponding to the long sides of said view.

2. In an apparatus of the character described, supporting means including two film guides at an angle of ninety degrees to each other, an optical system for observing a film placed in either of said film guides, an adjustable movable framing member having an oblong framing opening supported above said guides in the optical axis of said optical system and means for operating said member to frame a picture on a film placed in either of said guides for observation with the long sides of said opening corresponding to the long sides of said picture.

3. In an apparatus of the character described, supporting means, an optical system thereon, means for selectively guiding either a film or a lantern slide into position in said supporting means into optical viewing relation by said optical system, a rotatable framing member having an oblong framing opening supported above said guiding means in the optical axis of said optical system and means for rotating said member to frame a film picture or a lantern slide view selectively placed in said guiding means for observation with the long sides of said opening corresponding to the long sides of said picture or view.

4. In an apparatus of the character described, supporting means including two intersecting film guides at an angle of ninety degrees to each other, an optical system above said guides, a source of light and a ground glass below said film guides, the point of intersection of said guides forming an opening in central optical alinement with said ground glass and said optical system, adjustable means including an oblong opening for framing a picture on a film placed in either of said film guides for viewing by said optical system, means for adjustably supporting said framing means in the optical axis of said system and means for operating said framing means to cause the long sides of said oblong opening to correspond with the long sides of said picture.

5. In an apparatus of the character described, a base having a top including two open-top intersecting film guides at an angle of ninety degrees to each other, said film guides being open ended for passing a film therein from one side of the apparatus to the other side, an opening in said guides at their point of intersection, a ground glass in said opening, a lamp in said base below said ground glass, a housing on said base, said housing having a foot including and inclined open ended lantern slide channel for passing a lantern slide by gravity from one side of said apparatus to the other side, an optical system in said housing, an adjustable framing member in the housing below said optical system having a view framing opening and means for swingably clamping said housing to said base to bring said optical system and framing member opening into optical alinement with the point of intersection of said film guides and with the said ground glass.

6. In an apparatus of the character described, a base including film guiding means, a housing on said base including a lantern slide guiding channel, an optical system in said housing for observing a lantern slide in said channel or a film in said film guiding means, a detachable framing member in said housing below said optical system and means for swingably mounting the housing to said base to bring said optical system and framing member into optical viewing alinement with said film guiding means and whereby to swing said housing to one side of said base to gain access to said framing member to exchange the same with another different framing member.

7. In an apparatus of the character described, a base including film guiding means, a housing on said base including a lantern slide guiding channel, an optical system in said housing for observing a lantern slide in said channel or a film in said film guiding means, a detachable framing member in said housing below said optical system and means for swingably securing the housing to said base to bring said optical system and framing member into optical viewing alinement with said film guiding means and whereby to swing said housing to one side of said base to gain access to said framing member to exchange the same with another different framing member, and cooperating means on said base and housing to limit the swinging movement of the housing relative to the base.

8. In an apparatus of the character described, a base having an inclined top provided with two open top intersecting film guides at ninety degrees to each other, a housing above said base having a lantern slide channel in parallel relation to said guides above the same, an optical system in said housing, viewing openings in the latter and said base in optical alinement with said optical system for viewing a film placed in either of said guides or a lantern slide placed in said channel to be viewed through said optical system, a detachable mounted framing member in said housing having an opening in optical alinement with said viewing openings for framing the view to be observed and means for swingably mounting said housing on said base for accessibility to said framing member to detach the same and replace it with another like member having a different opening to accord with the size of the view to be observed.

ALFRED BOCH.